United States Patent
Brew et al.

(10) Patent No.: US 10,640,121 B2
(45) Date of Patent: May 5, 2020

(54) VEHICLE CONTROL FOR REDUCING ROAD WEAR

(71) Applicant: International Business Machines Corporation, Armonk, NY (US)

(72) Inventors: Kevin W. Brew, White Plains, NY (US); Michael S. Gordon, Yorktown Heights, NY (US); James R. Kozloski, New Fairfield, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 15/581,028

(22) Filed: Apr. 28, 2017

(65) Prior Publication Data

US 2018/0314258 A1    Nov. 1, 2018

(51) Int. Cl.
*G05D 1/02* (2020.01)
*G05D 1/00* (2006.01)
(Continued)

(52) U.S. Cl.
CPC ............ *B60W 40/06* (2013.01); *B60W 30/10* (2013.01); *G05D 1/0212* (2013.01); *B60W 2550/12* (2013.01); *B60W 2550/141* (2013.01); *B60W 2550/147* (2013.01); *B60W 2550/30* (2013.01); *G05D 2201/0213* (2013.01)

(58) Field of Classification Search
CPC .... B60W 30/00; B60W 30/08; B60W 30/095; B60W 30/10; B60W 30/18163; B60W 40/06; B60W 50/14; B60W 2420/42; B60W 2420/52; B60W 2550/12; B60W 2550/141; B60W 2550/147; B60W 2550/30; B60W 2720/24; B62D 15/025; B62D 15/029; G05D 1/0088; G05D 1/0212;
(Continued)

(56) References Cited

U.S. PATENT DOCUMENTS 8,363,104 B2    1/2013   Imai et al.
8,676,442 B2    3/2014   Lynar et al.
(Continued)

FOREIGN PATENT DOCUMENTS

CA         1152373 A1    8/1983

OTHER PUBLICATIONS

Rowan, S, Clear, M, Gerla, M. "Securing vehicle to vehicle communications using blockchain through visible light and acoustic side-channels", 2017, https://arxiv.org/abs/1704.02553 (Year: 2017).*
(Continued)

*Primary Examiner* — Thomas G Black
*Assistant Examiner* — Ce Li Li
(74) *Attorney, Agent, or Firm* — Law Office of Jim Boice (57) ABSTRACT

In a computer-implemented method embodiment of the present invention, a self-driving vehicle (SDV) is steered onto a particular tire path on a roadway based on past taken tire paths. One or more processors determine a pattern of tire path usage by vehicles on a roadway. Based on this previous tire path usage, the processor(s) direct an SDV on-board computer on an SDV to pick at least one second tire path for the SDV to drive thereon based on the pattern of tire path usage by the vehicles on the roadway.

14 Claims, 8 Drawing Sheets

(51) Int. Cl.
*B60W 30/10* (2006.01)
*B60W 40/06* (2012.01)

(58) Field of Classification Search
CPC .. G05D 1/0219; G05D 1/0231; G05D 1/0255; G05D 1/0257
See application file for complete search history.

(56) References Cited

U.S. PATENT DOCUMENTS

| | | | |
|---|---|---|---|
| 8,818,670 B2 | 8/2014 | Lynar et al. | |
| 9,062,983 B2* | 6/2015 | Zych | G01C 21/32 |
| 9,280,156 B1 | 3/2016 | Ferguson et al. | |
| 2001/0021888 A1* | 9/2001 | Burns | G05D 1/0278 |
| | | | 701/23 |
| 2006/0031008 A1 | 2/2006 | Kimura et al. | |
| 2007/0179690 A1* | 8/2007 | Stewart | G01C 21/00 |
| | | | 701/23 |
| 2009/0259349 A1* | 10/2009 | Golenski | G07C 5/008 |
| | | | 701/2 |
| 2013/0030680 A1* | 1/2013 | Friedlander | B60W 40/06 |
| | | | 701/117 |
| 2013/0054133 A1* | 2/2013 | Lewis | G01C 21/3407 |
| | | | 701/423 |
| 2013/0211720 A1* | 8/2013 | Niemz | G01C 21/20 |
| | | | 701/538 |
| 2015/0207859 A1* | 7/2015 | Lu | H04L 67/10 |
| | | | 709/202 |
| 2016/0272243 A1* | 9/2016 | Matsuno | B62D 15/025 |
| 2017/0371336 A1* | 12/2017 | Mei | G05D 1/0212 |

OTHER PUBLICATIONS

Anonymous, "Traffic Talk: Heavy Traffic, Pavement Flexibility Causes Ruts in Asphalt Roads". The Oklahoman, Jan. 19, 2015. Web Dec. 6, 2016. <http://newsok.com/article/5385835>.

Elvin Aycock, "Roadway Ruts Cause Hyrdoplaning". Atlanta Engineering Services, Inc. Web Dec. 5, 2016. <http://www.atlantaeng.com/ruts_cause_hydroplaning.html>.

Philip E. Ross, "Tesla Reveals Its Crowdsourced Autopilot Data". IEEE Spectrum, May 26. 2016. Web Dec. 5, 2016. <http://spectrum.ieee.org/cars-that-think/transportation/self-driving/tesla-reveals-its-crowdsourced-autopilot-data>.

Chalupnik et al., "The Effect of Roadway Wear on Tire Noise: WA-RD 276.1, Final Report". Washington State Department of Transportation, Washington State Transportation Commission, Aug. 1992, pp. 1-34.

Philip A. Viton, "Understanding Road Wear and Its Causes". CRP—776 Road Wear, Jan. 26, 2012.

Ordonez et al., "Laser-Based Rut Detection and Following System for Autonomous Ground Vehicles". Journal of Field Robotics, vol. 28, Issue 2 (2011), pp. 158-179.

Hanson et al., "Tire-Pavement Noise Study: NCAT Report 04-02". National Center for Asphalt Technology, Auburn University, Aug. 2004.

P. Mell et al., "The NIST Definition of Cloud Computing", National Institute of Standards and Technology, Information Technology Laboratory, Sep. 2011, pp. 1-7.

\* cited by examiner

VEHICLE CONTROL FOR REDUCING ROAD WEAR

BACKGROUND

The present invention relates generally to the field of vehicles, and specifically to the field of self-driving vehicles. Still more specifically, the present invention relates to the field of managing where self-driving vehicles travel along roadways.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

One feature of SDVs is that they are able to drive with a level of precision that far exceeds that of human drivers. This provides many advantages over human-driven vehicles, such as accident avoidance, better gas mileage, the ability to drive closer together (due to reaction times that far exceed those of humans), etc. However, one drawback to this high level of precision is that SDVs tend to operate in a perfectly uniform manner. That is, when SDVs travel along a same lane on a stretch of road, they all tend to travel exactly in the middle of the lane, in order to avoid crowding or hitting vehicles in adjacent lanes. Unfortunately, this uniform location results in the same part of the lane always being driven upon, which leads to premature rutting on the roadway.

SUMMARY

In a computer-implemented method embodiment of the present invention, a vehicle is steered onto a particular tire path on a roadway based on past-taken tire paths. One or more processors determine a pattern of tire path usage by vehicles on a roadway. Based on this previous tire path usage, the processor(s) direct an on-board computer on the vehicle to pick at least one second tire path for the vehicle to drive on. By adjusting where the vehicle drives, the roadway experiences less rutting (especially if the roadway is paved) if the vehicle drives along a different tire path.

In an embodiment of the present invention, if the roadway is unpaved, the vehicle is directed to take a tire path on the roadway that has been used most frequently, thus packing down a rut on the unpaved roadway, which leads to better traction for the vehicle.

In another computer-implemented method embodiment of the present invention, one or more processors determine a pattern of tire path usage by vehicles on a roadway. The processor(s) then direct a Self-Driving Vehicle (SDV) on-board computer of an SDV to recommend at least one tire path for the SDV to drive thereon based on the pattern of tire path usage by the vehicles on the roadway. Thus, the SDV is autonomously steered along a tire pathway that minimizes rutting on the roadway.

In another computer-implemented method embodiment of the present invention, one or more processors determine a pattern of tire path usage by multiple Self-Driving Vehicles (SDVs) on a roadway. An SDV on-board computer on a present SDV that is currently traveling on the roadway receives the pattern of tire path usage by the multiple SDVs that have traveled on the roadway during a past time period. One or more processors then direct an SDV on-board computer of the present SDV to control the present SDV to travel along at least one tire path based on the pattern of tire path usage by the multiple SDVs that have previously traveled on the roadway. Thus, the present SDV that is traveling on the roadway learns from the other SDVs where the other SDVs have traveled on the roadway, such that the present SDV picks a tire path that minimizes roadway rutting (in the case of a paved roadway) or packs down a tire path (in the case of an unpaved roadway).

Other embodiments of the present invention include a computer program product and a computer system for implementing some or all of the computer-implemented methods described herein.

DETAILED DESCRIPTION

Figure 1:
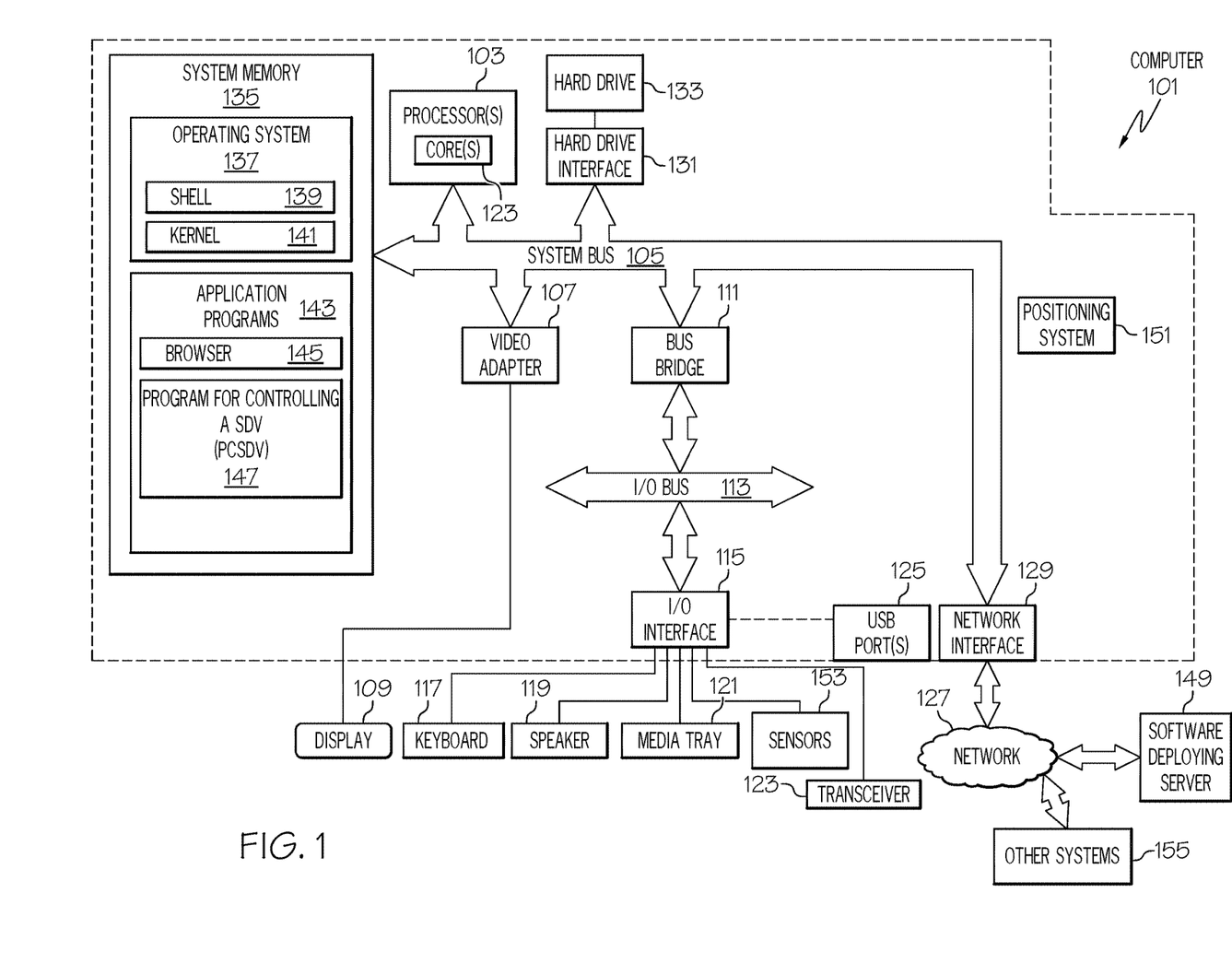
FIG. 1 depicts an exemplary system in accordance with one or more embodiments of the present invention.

With reference now to the figures, and in particular to FIG. 1, there is depicted a block diagram of an exemplary system and network in accordance with one or more embodiments of the present invention. Some or all of the exemplary system and network, including depicted hardware and/or software, shown for and within computer 101 can be utilized by software deploying server 149 or other systems 155 shown in FIG. 1; and/or monitoring system 301 shown in FIG. 3; and/or SDV on-board computer 401 shown in FIG. 4.

Referring now to FIG. 1, exemplary computer 101 includes processor(s) 103, operably coupled to a system bus 105. Although a single processor and core are shown, computer 101 may embody or use multiple processors 103, one or more of which may have one or more processor core(s) 123. A video adapter 107, which drives/supports a display 109 (which may be a touch screen capable of receiving touch inputs), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a speaker 119, a media tray 121 (which may include storage devices such as CD-ROM drives, multi-media interfaces, etc.), a transceiver 123 that is able to send and transmit wireless electronic messages, sensors 153 that are able to identify traffic and roadway conditions around a vehicle, and external USB port(s) 125. While the format of the ports connected to I/O interface 115 may be any known to those skilled in the art of computer architecture, in one or more embodiments, some or all of these ports are universal serial bus (USB) ports.

As depicted, network interface 129 is also coupled to system bus 105. Network interface 129 can be a hardware network interface, such as a network interface card (NIC), etc. Computer 101 is able to communicate with a software deploying server 149 and/or other systems 155 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 includes a wireless network, such as a Wi-Fi network, and a cellular network. Some embodiments are implemented in a network "cloud" environment, examples of which will be discussed with reference to FIGS. 7 and 8.

Referring again to FIG. 1, a hard drive interface 131 is also coupled to system bus 105. Hard drive interface 131 interfaces with a hard drive 133. In one embodiment, hard drive 133 is a non-volatile memory storing and populates a system memory 135 (e.g., random access memory (RAM)), which is also coupled to system bus 105. System memory may be considered a lowest level of volatile memory in computer 101. System memory 135 may include additional, higher levels of volatile memory (not shown), including, but not limited to, cache memory, registers and buffers. Data that populates system memory 135 includes operating system (OS) 137 and application programs 143 of computer 101.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application program(s) 143 can include a renderer, shown in exemplary manner as a browser 145. Browser 145 includes program modules and instructions (not depicted) enabling a world wide web (WWW) client (e.g., computer 101) to send and receive network messages from network 127 (e.g., the Internet using hypertext transfer protocol (HTTP) messaging), thus enabling communication with software deploying server 149 and/or other systems 155.

In some embodiments, application program(s) 143 in system memory 135 of computer 101 include one or more software programs for controlling a self driving vehicle (PCSDV) 147 in accordance with the present invention. In some embodiments, system memory 135 and/or application program(s) 143 can be shared/distributed across one or more software deploying servers 149 and/or other systems 155. As depicted, PCSDV 147 includes program instructions (software) adapted for implementing processes and/or functions in accordance with the present invention, such as those described with reference to FIGS. 2-6. In some embodiments, PCSDV 147 is downloaded from software deploying server 149, (on-demand or "just-in-time", such that the software in PCSDV 147 is not downloaded until needed for execution). In one embodiment of the present invention, software deploying server 149 performs all of the functions associated with the present invention (including execution of PCSDV 147), thus freeing computer 101 from having to use its own internal computing resources to execute PCSDV 147.

Also within computer 101 is a positioning system 151, which is described in further detail below.

The elements depicted in computer 101 are not intended to be exhaustive, but rather are representative to highlight components thought to be more important to this example of the present invention. For instance, computer 101 may include alternate memory elements and/or storage devices such as flash memory, magnetic cassettes, digital versatile disks (DVDs), Bernoulli cartridges, and the like. These and other variations are intended to be within the spirit and scope of the present invention.

Embodiments of the present invention include a method and system for automatically positioning a self-driving vehicle (SDV) within a road lane based on road-input data, thus achieving a certain distribution of locations on the road through time (e.g. travel paths along and within a lane). Controlling where the SDV drives on the road lane results in 1) extending the life of the roadway, and 2) improving the safe operation of the SDV.

SDVs are able to drive with a precision that exceeds manual driving. As such, rather than drifting from side to side in a lane (and yet still remaining within the borders of the lane), an SDV will maintain a path that is in the same position within the lane every time it travels along the roadway. The problem with such precision is that, after a while, certain portions of the lane come into more frequent contact with the tires of the SDV, while other portions of the lane do not. This precision can lead to premature wear (rutting) of portions of the lane.

Figure 2:
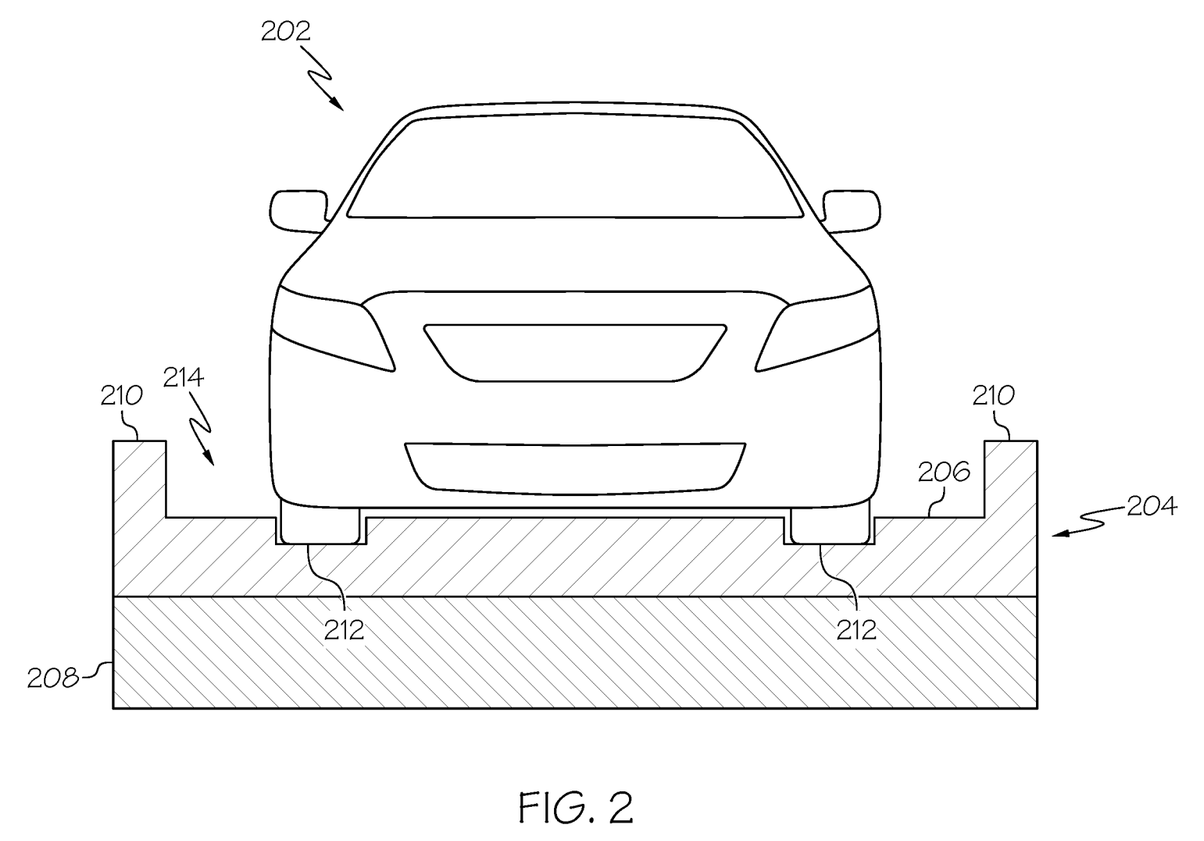
FIG. 2 illustrates an example of a self-driving vehicle (SDV), in accordance with one or more embodiments of the present invention.

For example, consider the self-driving vehicle 202 shown traveling on roadway 204 in FIG. 2. Roadway 204 has a roadway surface 206 that lies atop a subgrade 208 (e.g., stabilized soil). As shown in FIG. 2, SDV 202 is traveling exactly in the middle of the depicted lane 214 (i.e., equidistant from the roadway edges 210). By traveling in this exact same tire path over and over, eventually rutted tire paths 212 will occur, due to deformation of the roadway surface 206 and the underlying subgrade 208.

Figure 3:
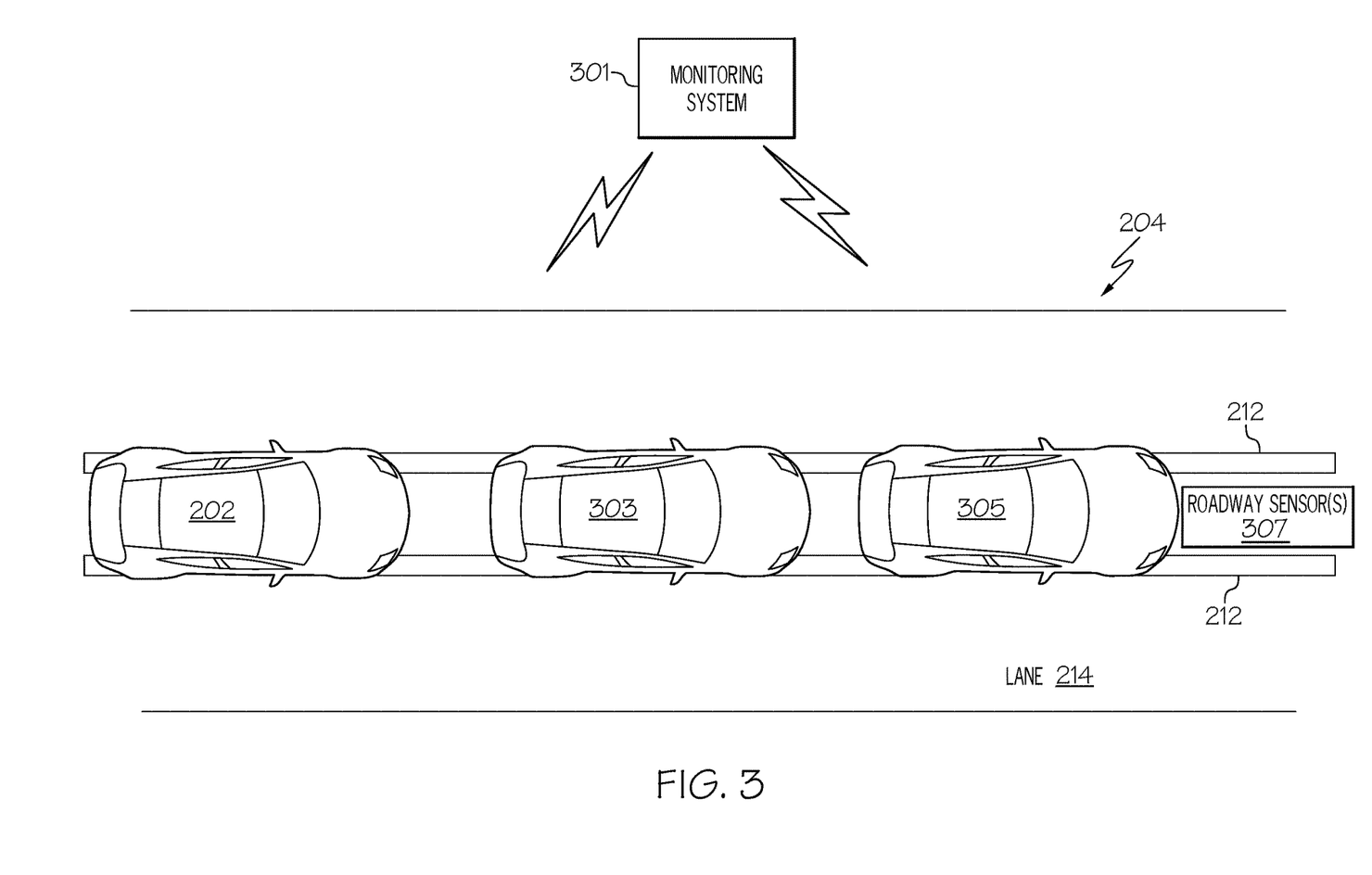
FIG. 3 depicts additional detail of FIG. 2.

FIG. 3 illustrates an example of a self-driving vehicle (SDV), in accordance with one or more embodiments of the present invention. With particular reference now to FIG. 3, an overhead view of SDV 202 traveling on lane 214 with its tires in a rutted (worn) tire path 212 is depicted. While FIG. 2 and FIG. 3 show the rutted tire path 212 as actually being rutted (indented into) the lane 214, in one or more embodiments of the present invention, formation of the rutted tire path 212 is avoided by making the SDV 202 (and other vehicles such as SDV 303 and SDV 305) avoid consistently driving just on the area depicted as rutted tire path 212.

In some embodiments of the present invention, roadway sensor(s) 307 are able to assist SDV 202 and/or a monitoring system 301 in determining the current condition of the roadway 204 (and thus lane 214). For example, roadway sensor(s) 307 can include (without limitation): vibration sensors, thermometers, cameras, strain gauges, microphones, chemical sensors, pressure sensors, etc., that will generate sensor readings that indicate roadway data. Examples (without limitation) of such roadway data include data about a width of the roadway 204; an amount of traffic on the roadway 204; a speed of traffic on the roadway 204; types of other vehicles on the roadway 204; weights of other vehicles on the roadway 204; weather conditions on the roadway 204; defects in a surface of the roadway 204; the type of material used to construct the roadway 204 (e.g., hard materials such as asphalt, concrete, composite pavement, and bituminous surfaces or soft material such as snow, sand, mud, loose gravel, and dirt.).

In one embodiment of the present invention, the type of material used to construct the roadway is determined by roadway sensor(s) 307 adapted to be able to detect the amount of vibration in the roadway 204 when vehicles pass by. The vibrations may be represented as vibration signatures, which can be matched to a particular type of roadway construction material. That is, concrete will present a first vibration signature, while asphalt will present a second vibration signature, etc. as vehicles pass over the material. Alternatively, the material used to construct roadway 204 may be stored in a database associated with monitoring system 301. This database can be derived from construction records provided to and/or maintained by local governmental roadway entities (e.g., departments of transportation at the city, county, state, or federal level).

Figure 4:
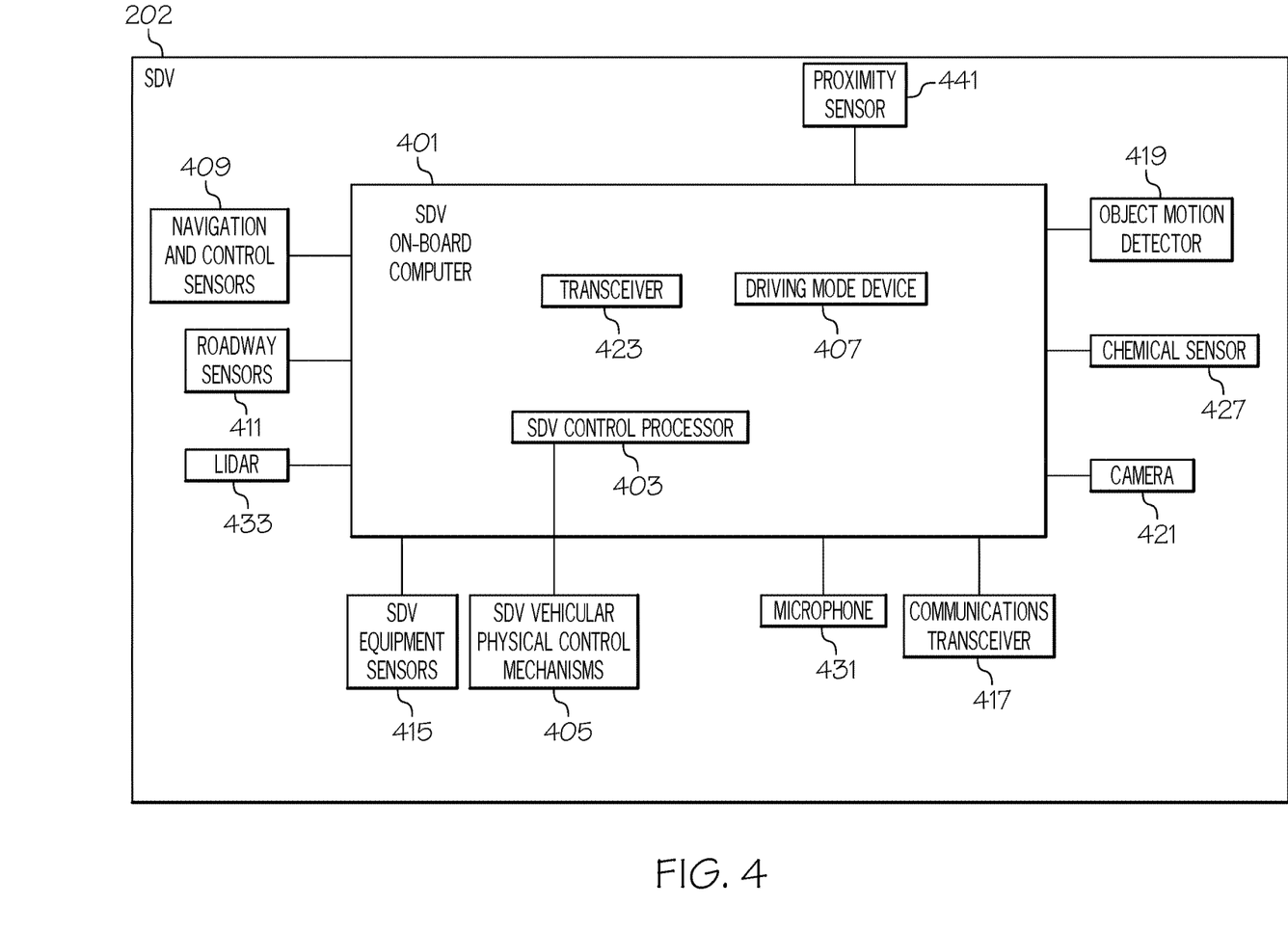
FIG. 4 illustrates additional detail of one or more SDVs illustrated in FIGS. 2-3.

With reference now to FIG. 4, additional detail of an exemplary SDV 202 in accordance with one or more embodiments of the present invention is depicted. As shown in FIG. 4, an exemplary SDV 202 has an SDV on-board computer 401 that can autonomously control one or more operations of SDV 202, and which has been configured to select a specific tire path in accordance with one or more embodiments of the present invention. SDV on-board computer 401 includes a driving mode device 407 that can provide directives that selectively allow the SDV 202 to be operated in manual mode or autonomous mode. In some embodiments, driving mode device 407 is a dedicated hardware device that can selectively direct the SDV on-board computer 401 to operate the SDV 202 in an autonomous mode or in a manual mode.

While in autonomous mode, SDV 202 autonomously operates without the input of a human driver, such that the engine, steering mechanism, braking system, horn, signals, etc. are controlled by the SDV control processor 403, which is under the control of the SDV on-board computer 401. For example, the SDV on-board computer 401 operates in autonomous mode based on the processing of information from navigation and control sensors 409 and driving mode device 407 (indicating that the SDV 202 is to be controlled autonomously). In other words, in autonomous mode, manual driver inputs to the SDV control processor 403 and/or SDV vehicular physical control mechanisms 405 are not needed, as opposed to semi-autonomous mode in which the SDV on-board computer 407 will "back up" the inputs made by the driver. That is, in autonomous mode, the SDV 202 can operate with no human input whereas in semi-autonomous mode, the SDV 202 is controlled by a combination of driver inputs (e.g., for steering, braking, etc.) along with computer backup (e.g., automatically braking the SDV 202 if the driver does not react to an obstacle quickly enough).

As mentioned, the SDV on-board computer 401 uses information from navigation and control sensors 409 to control the SDV 202. Navigation and control sensors 409 may include sensors (hardware and/or software) that: 1) determine the location of the SDV 202 on or relative to a roadway; 2) sense other cars and/or obstacles and/or physical structures around SDV 202; 3) measure the speed and direction of the SDV 202; and/or 4) provide any other inputs needed to safely control the movement of the SDV 202.

By way of example only, a location of the SDV 202 can be determined through the use of a positioning system such as positioning system 151 shown in FIG. 1. Positioning system 151 may use a global positioning system (GPS), which uses space-based satellites that provide positioning signals that are interpreted by a GPS receiver to determine a geophysical position of the SDV 202. Positioning system 151 may also use, either alone or in conjunction with the GPS system, physical movement sensors such as accelerometers (which measure acceleration of a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

Another example of positioning system element of SDV 202 is a Light Detection and Ranging (LIDAR) 433 (shown in FIG. 4) or Laser Detection and Ranging (LADAR) system which allows the presence and location of other physical objects to be ascertained by the SDV on-board computer 401 by measuring the time it takes to receive back the emitted electromagnetic radiation (e.g., light), and/or evaluate a Doppler shift (i.e., a change in frequency to the electromagnetic radiation that is caused by the relative movement of the SDV 202 to objects being interrogated by the electromagnetic radiation).

Some embodiments of positioning system 151 may use radar or other electromagnetic energy that is emitted from an electromagnetic radiation transmitter (e.g., transceiver 423 shown in FIG. 4), bounced off a physical structure (e.g., another car), and then received by an electromagnetic radiation receiver (e.g., transceiver 423) e.g., to sense or assist the sensing of other cars and/or obstacles and/or physical structures around SDV 202.

A speed and direction measurement of the SDV 202 may be accomplished by taking readings from an on-board speedometer (not depicted) on the SDV 202 and/or detecting movements to the steering mechanism (also not depicted) on the SDV 202 and/or the positioning system 151 discussed above.

Other inputs directed to safe control of the SDV 202 include, but are not limited to, control signals to activate a horn, turning indicators, flashing emergency lights, etc. on the SDV 202.

In one or more embodiments of the present invention, SDV 202 includes integrated roadway sensors 411 that are physically coupled to the SDV 202. Roadway sensors 411 may include a camera 421 and/or other sensors (heat sensors, moisture sensors, thermometers, etc.) that are able to detect the amount of water, snow, ice, etc. on the roadway 204 shown in FIG. 2 and FIG. 3.

For example, camera 421 may be trained on a roadway 204 that the SDV 202 is traveling, in order to provide images of conditions on the roadway 204 upon which the SDV 202 is traveling. An object motion detector 419 (e.g., a radar transceiver capable of detecting Doppler shifts indicative of the speed and direction of movement of other vehicles, animals, persons, etc. on the roadway 204) may similarly be trained on the roadway 204.

In some embodiments of the present invention, SDV 202 includes equipment sensors 415. SDV equipment sensors

415 may include cameras aimed at tires on the SDV 202 to detect how much tread is left on the tire, whether or not the tires are studded (e.g., "snow tires" with metal studs embedded therein for improved traction, but at the expense of additional damage to the roadway surface). SDV equipment sensors 415 may include electronic sensors that detect how much padding is left of brake calipers on disk brakes. SDV equipment sensors 415 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 415 may include sensors that detect the condition of other components of the SDV 202, including lights (e.g., using circuitry that detects if a bulb is broken), wipers (e.g., using circuitry that detects a faulty wiper blade, wiper motor, etc.), etc. Thus, in one or more embodiments of the present invention, if the SDV on-board computer 401 is trying to decide which tire path to take, this decision may be impacted by the current condition of the SDV 202.

In one or more embodiments of the present invention, SDV 202 includes a communications transceiver 417, which is able to receive and transmit electronic communication signals (e.g., radio frequency (RF) messages) from and to other communications transceivers found in other vehicles, servers, monitoring systems, etc.

In one or more embodiments of the present invention, also within SDV 202 is a proximity sensor 441, which can use motion detectors, radar (using Doppler shifting logic), etc., to detect an object (e.g., a vehicle in a next lane) near SDV 202.

In one or more embodiments of the present invention, also within SDV 202 is a chemical sensor 427, which can detect the presence of certain chemicals (e.g., oil, gasoline, etc.) on the roadway 204 around the SDV 202.

In one or more embodiments of the present invention, also within SDV 202 is a microphone 431, which can be used to detect noises (e.g., road noise) around the SDV 202, which may indicate roadway surface conditions, traffic conditions, etc.

With reference again to FIG. 3, data related to traffic patterns (e.g., which tire paths have been taken, traffic volume, etc.) and/or roadway conditions (e.g., weather, rutting, etc.) can be shared between SDVs 202, 303, 305 to estimate the amount of wear existing on the roadway 204.

In some embodiments, information may be shared from a blockchain that the SDVs 202, 303, 305 maintain, which can improve security (so that an SDV cannot be "hacked"). An example of a blockchain will be discussed in more detail with reference to FIG. 5.

SDV 303 may use known technical art to visually detect ruts in roadway 204. This information may be shared between SDVs so as to shape or encourage future road distribution driving patterns for SDVs. By way of further example, through the aggregated data/information of SDVs described herein, certain road wear patterns may be estimated. In some embodiments, an SDV may make use of road wear pattern estimate information ("W") for sections of a road. W may be communicated among vehicles (e.g., the SDVs), and a historical account of estimated road wear may be created (e.g., storing W for a section of road in a blockchain). Blockchain technology may then be used to create a robust, tamper-proof, and always-available means for storing such information. In some embodiments, W may also contain information regarding road type (including estimated surface material) and other parameters, which may be used when planning roadway construction, positioning of SDVs, etc.

While information may be written to a blockchain in a continuous manner, in some embodiments, the blockchain is written to in response to certain events. For example, once more than a predetermined number of SDVs (e.g., more than 1000) pass over a certain path (e.g., rutted tire path 212 on roadway 204), this will trigger the blockchain to be updated to 1) reflect the number of SDVs that have passed over that certain path and/or 2) update the physical deterioration that has occurred to the rutted tire path 212 since the blockchain was last written to (before the 1000 SDVs passed over the rutted tire path).

Figure 5:
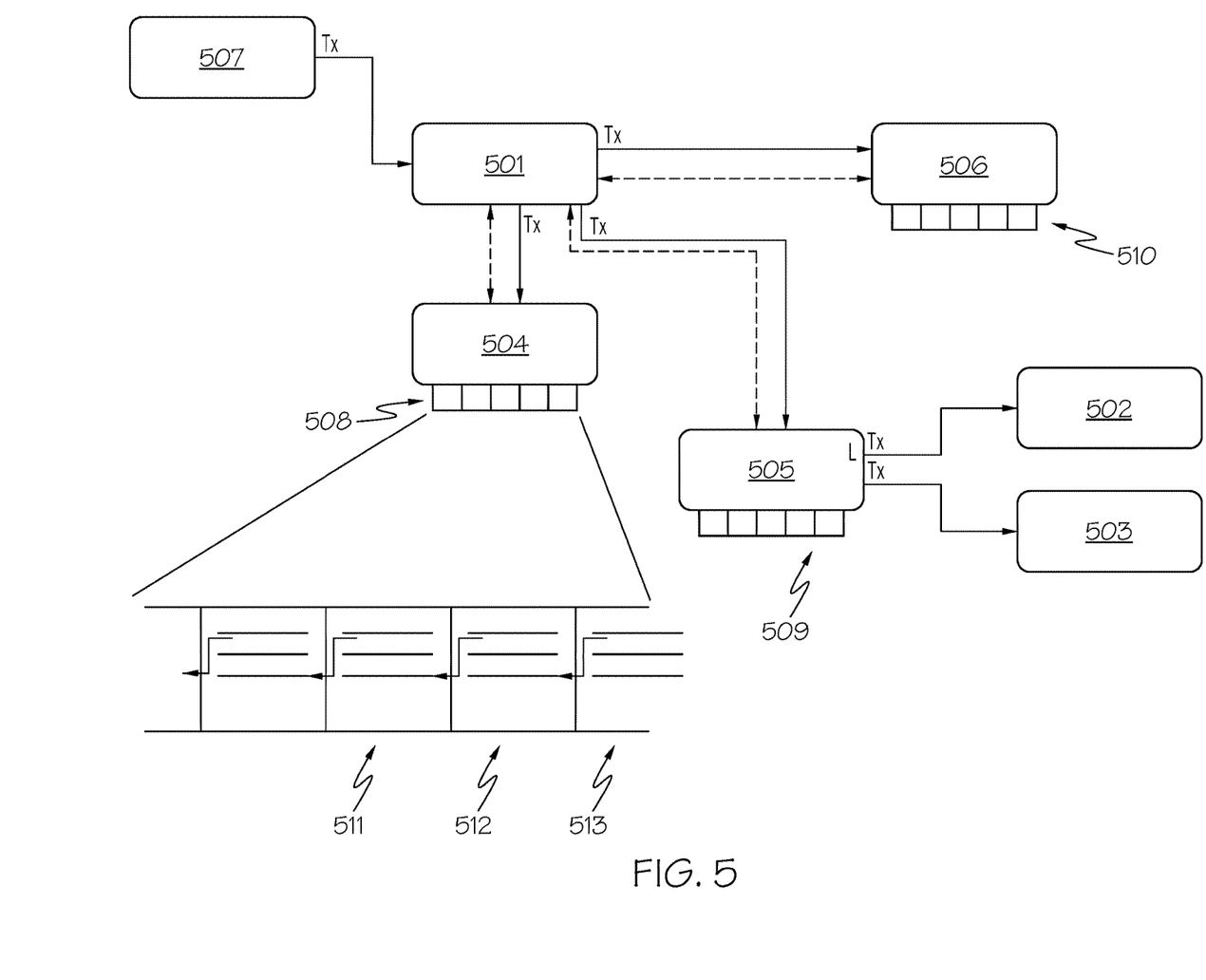
FIG. 5 depicts an exemplary blockchain in accordance with one or more embodiments of the present invention.

With reference now to FIG. 5, an exemplary blockchain as used and maintained by multiple SDVs to store information about the state of roadway 204 is presented. Information stored in the blockchain maintained by these multiple SDVs may include a record of the paths taken by cars, the speed and number of cars on the roadway 204, records of communications between the SDVs, etc. As shown in FIG. 5, computers 501, 502, 503, 504, 505, and 506 (e.g., SDV on-board computers 401 found in various SDVs) represent an exemplary peer-to-peer network of devices used to support a peer blockchain (in which more or fewer computers/ machines may form the peer-to-peer network of devices). Each of the computers 501, 502, 503, 504, 505 and 506 (which may include telecommunication devices) of the peer-to-peer network has a copy of data (e.g., data that represents telecommunication device events), as held in ledgers stored within the blockchains 508, 509, 510 that are associated with respective computers 504, 505, 506.

As shown in FIG. 5, a client 507 (e.g., a telecommunication device that initiates a blockchain transaction) sends a transaction Tx (e.g., an event that occurred at the telecommunication device) to the client's peer (depicted as computer 501). Computer 501 then sends the transaction Tx to the corresponding ledgers of blockchains 508, 509, 510 associated with other peers, e.g., computers 502, 503 504, 505, 506.

Blocks within exemplary blockchain 508 are depicted as block 511, block 512, and block 513. In this example, block 513 can be a newest entry into a ledger held in blockchain 508, and includes not only the newest transactions but also a hash of the data from older block 512, which includes a hash of even older block 511. Thus, oldest blocks are made even more secure each time a new block is created, due to the hashing operations.

Referring again to the example of FIG. 5, assume that the peer-to-peer network employs a consensus model and computer 505 has been designated as a leader peer L according to such a consensus model. As such, the leader peer (computer 505) organizes all transactions from the nodes/peers/ computers/telecommunication devices 501-506, and then shares new blocks/transactions (Tx) with other nodes (e.g., blockchains 515 and 517 shown associated with respective computers 502, 503) as depicted. The nodes/computers that receive the new block/transaction (Tx) then validate the new block/transaction. In some embodiments, if enough (i.e., some predefined quantity/percentage) of the nodes/computers validate the new block/transaction, then the new block/ transaction is deemed valid for the entire peer-to-peer network of computers 501-506 and Tx is added (as valid) to the blockchains (including the depicted blockchains 508, 509, 510) associated with all of the nodes/peers/computers 501-506. Thus, the blockchain system depicted in FIG. 5 provides additional security for past data regarding how other vehicles have traveled along a roadway, as well as addition security for controlling directions to on-board SDV computers used to controls SDVs.

Figure 6:
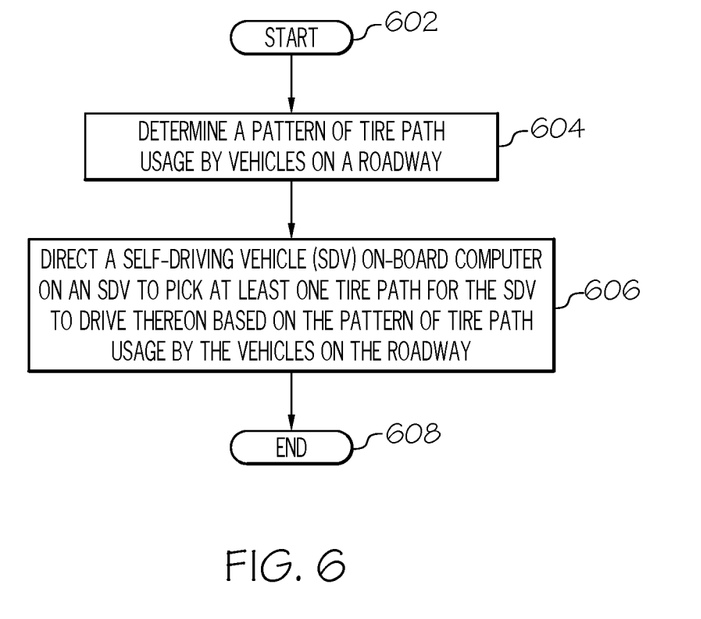
FIG. 6 illustrates an exemplary process in accordance with one or more embodiments of the present invention.

FIG. 6 illustrates an exemplary process in accordance with one or more embodiments of the present invention.

After initiator (start) block 602, the process proceeds to block 604. In block 604, one or more processors (e.g., within monitoring system 301 and/or an SDV on-board computer 401) determine a pattern of tire path usage by vehicles on a roadway (e.g., roadway 204). The term "pattern of tire path usage" is defined as a historical pattern of where tires have been rolling along the roadway 204. That is, by using a history of roadway sensor readings taken by roadway sensor(s) 307 and/or by positioning information generated by a positioning system 151 in one or more vehicles, a determination can be made as to where vehicular traffic has traveled along the roadway 204, and more specifically the lateral distance from the sides of a lane 214 that such vehicles have been traveling. In some embodiments, each SDV selects a tire path that is offset from other SDVs, so that all of the SDVs do not drive on the same tire path, with a goal of minimizing the possibility of damage to roadway 204.

In block 606, one or more processors direct a self-driving vehicle (SDV) on-board computer (e.g., SDV on-board computer 401 shown in FIG. 4) of an SDV (e.g., SDV 202) to pick one tire path (e.g., the least worn) for the SDV to drive thereon based on the pattern of tire path usage by the vehicles on the roadway. The term "tire path" is defined as a path on which a tire can roll along the roadway 204. If the same tire path is used repeatedly, then a rutted tire path 212 may result. If the roadway 204 is a paved roadway, then a rutted tire path 212 is undesirable, since its continued use may cause permanent damage to the roadway 204. However, if roadway 204 is an unpaved roadway, then a rutted tire path 212 may be desirable, since packed down tire ruts (e.g., on a dirt or snowy road) can provide improved traction.

For example, assume that the roadway is paved, and that there are multiple tire paths that can be taken (i.e., multiple paths that are to the left of, the right of, or in the middle of the lane 214). In order to avoid road rutting (i.e., creating the rutted tire path 212 shown in FIG. 2), the one or more processors will direct the SDV on-board computer to select a distribution of the multiple tire paths for the SDV to drive thereon, such that a same tire path is not always taken by the SDV while traveling along the lane 214. That is, the SDV on-board computer will drive on a path that is offset to the rutted tire path 212. Each next SDV will drive on a path that is offset in a different manner from the rutted tire path 212, such that no particular path will be driven over in a consistent manner that is damaging to the roadway 204.

However, if the roadway is unpaved (e.g., with a deep layer of snow or dirt on top of the roadway 204), then the rutted area may provide the best traction, and thus a most frequently used tire path is selected as the tire path for the SDV to drive thereon.

However, if the roadway is paved, then the SDV will be directed to avoid the rutted tire path by driving on other adjacent areas of the lane 214.

In an embodiment of the present invention, if the SDV is riding on studded tires (e.g., snow tires with metal studs for better traction), and the SDV is on a paved road (that is not snow-covered), the SDV will be directed to adjust its path selection accordingly (e.g., by moving back and forth in a certain stretch of roadway, in order to avoid digging into the paved roadway in the same area).

In one or more embodiments of the present invention, roadway conditions may be received by one SDV from other SDVs or other vehicles (including those that support a blockchain). The received information may be used by the SDV's on-board computer to adjust which tire path is chosen, such that an SDV that is currently driving on the roadway can learn from other SDVs where they have driven, such that the current SDV can adjust where it travels accordingly (e.g., in order to avoid rutting the roadway by traveling on the same tire paths as the other SDVs).

The flow-chart in FIG. 6 ends at terminator block 608.

In one or more embodiments of the present invention, a distributed or central cloud resource is used to store and manage driving and road wear patterns on a road. A municipality may maintain such a facility to receive information about planned or past lane positioning targets from SDVs. In this way, a distribution of road wear predictions may be maintained by the municipality. Points of aggregation of these data may be 1) toll booths, 2) EZ-pass communication hubs, 3) central facility connected to the Internet by which SDVs communicate their positions, 4) GPS navigation hubs (such as electronic maps) which can build up road wear expectancy maps based on data shared from the client/SDV side during navigation.

Furthermore, in one or more embodiments of the present invention, vehicle properties (e.g., weight, speed, axle dimensions, number of and arrangement of wheels, etc.) are shared along the section of road, in addition to lane position data, in order to create a weighted histogram of expected wear and tear on the lane. In this way, the weighted lane position histogram can be constructed and serve as a better resource for municipal planning and road maintenance execution.

In some embodiments, a command can be received from the municipality to control future lane positioning of SDVs. Because aggregation of positioning data and command relays are required locally for each stretch of road or highway, the construction of road wear aggregate distributions may be conducted in a distributed network of sensors along a road.

Furthermore, the processes described herein (i.e., detecting and/or predicting where rutting on the roadway will occur) may enable a road repair control and planning facility that is coupled to this cloud resource to predict where repairs are needed.

Some embodiments of the present invention thus facilitate a drive pattern optimization for reduced road wear. In some embodiments, the car pattern mean location and standard deviation may be controlled and shaped. If the distribution of car traversal paths are considered to be akin to "noise", then various noise characteristics may be considered or encouraged, at least along a portion of a lane near the center of the lane, such as: White noise, which has constant power spectral density; Gaussian noise, with a probability density function equal to that of a normal distribution; Pink noise, with a spectral density inversely proportional to frequency; Brownian noise or "brown" noise, with a spectral density inversely proportional to the square of frequency.

By way of further example, Gaussian white noise can describe a distribution of tire traversal paths along just a portion of a lane. Consider FIG. 3 as an example of a Gaussian distribution of road wear, caused by a tight distribution of traversal paths centered on the middle of a driving lane. When high wear patterns are detected, the self-driving vehicles/cars could be instructed to shift either left or right resulting in wearing out a different section of the roadway. When the road wears out at those positions, the cars can shift again, such that more uniform road wear occurs compared to the individual Gaussian distributions.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
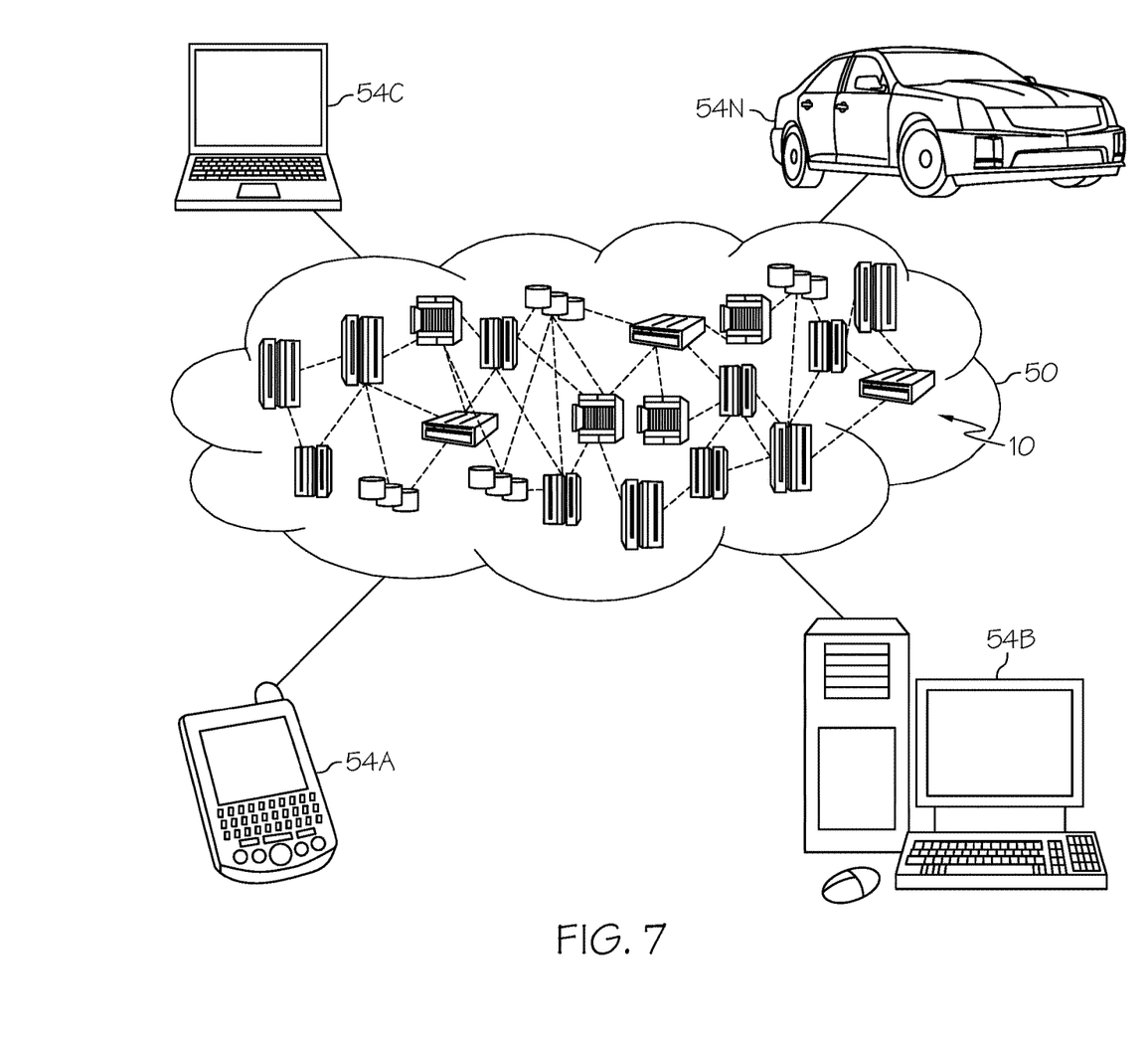
FIG. 7 depicts an exemplary cloud computing environment in accordance with one or more embodiments of the present invention.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as the Private, Community, Public, or Hybrid clouds described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
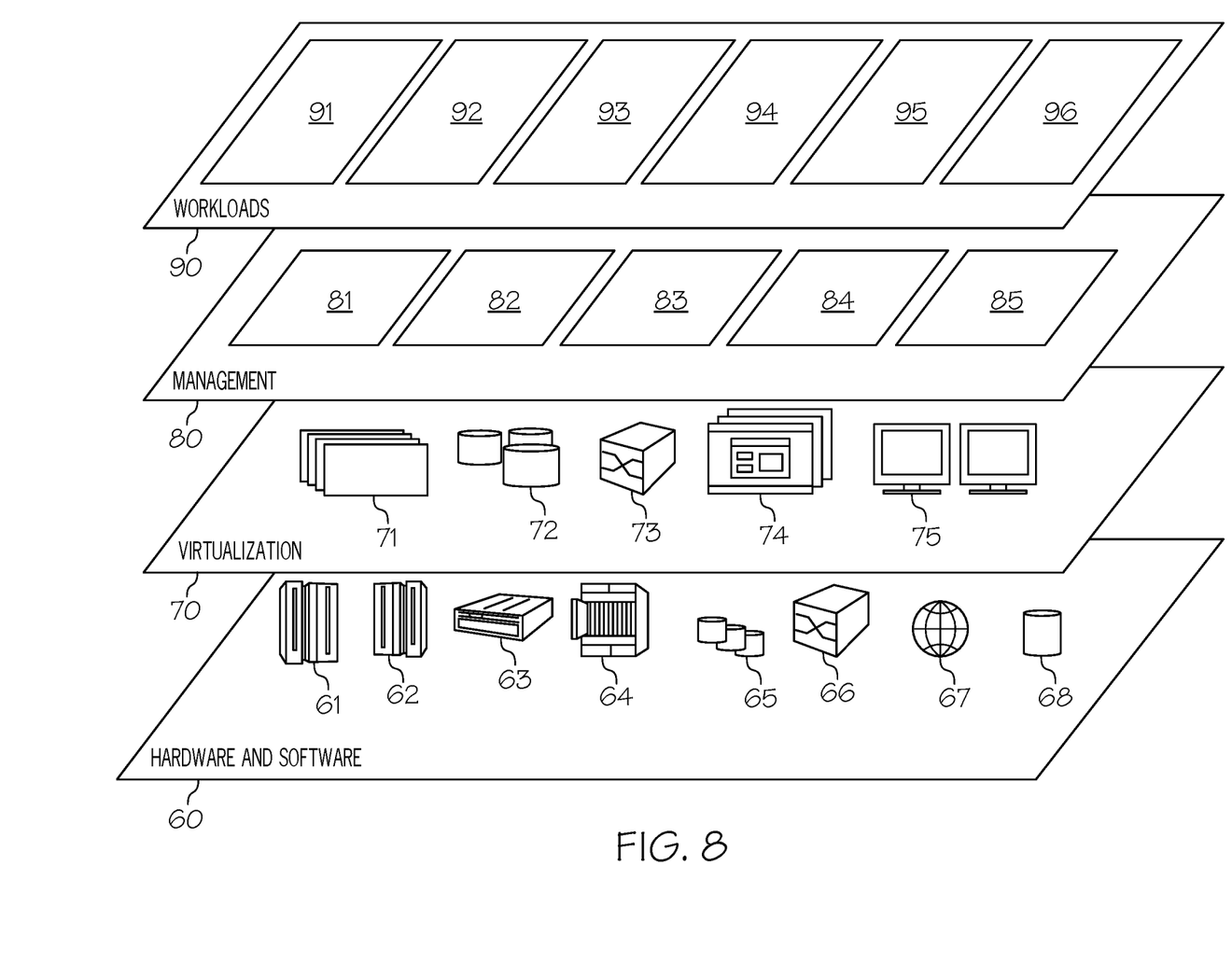
FIG. 8 depicts exemplary abstraction model layers of a cloud computing environment, in accordance with one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96, which performs one or more workloads and functions in accordance with the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Some embodiments of the present invention may be implemented through the use of a VHDL (VHSIC Hardware Description Language) program in conjunction one or more compatible electronic devices (sometimes referred to as VHDL chip). VHDL is an exemplary design-entry language for electronic devices such as Field Programmable Gate Arrays (FPGAs), Application Specific Integrated Circuits (ASICs), and other devices. By way of further example only, a computer implemented method (embodied in software) be emulated by a hardware-based VHDL program, which is then applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
   determining, by one or more processors, a pattern of tire path usage by vehicles on a roadway;
   directing, by one or more processors, an on-board computer of a vehicle to recommend at least one tire path for the vehicle to drive thereon based on the pattern of tire path usage by the vehicles on the roadway, wherein the vehicle is a self-driving vehicle (SDV);
   determining, by one or more processors, that the SDV is riding on studded tires; and
   adjusting, by one or more processors, which at least one tire path is chosen based on the SDV riding on the studded tires.

2. The computer-implemented method of claim 1, wherein the at least one tire path comprises multiple tire paths, and wherein the computer-implemented method further comprises:
   determining, by one or more processors, that the roadway is paved; and
   directing, by one or more processors, an SDV on-board computer on the SDV to select a distribution of the multiple tire paths of a paved roadway for the SDV to drive thereon.

3. The computer-implemented method of claim 2, wherein said determining, by one or more processors, that the roadway is paved, further comprises determining, by one or more processors, that the roadway is constructed of materials selected from a group consisting of asphalt, concrete, composite pavement, and bituminous surfaces.

4. The computer-implemented method of claim 1, wherein the computer-implemented method further comprises:
   identifying, by one or more processors, rutting in at least one tire path from the pattern of tire path usage by the vehicles on the roadway; and
   directing, by one or more processors, an SDV on-board computer on the SDV to pick a tire path that is less rutted than said at least one tire path for the SDV to drive thereon.

5. The computer-implemented method of claim 1, wherein the at least one tire path for the SDV is picked based on at least one factor from a group consisting of:
   a type of road material used to construct the roadway; a width of the roadway; an amount of traffic on the roadway; a speed of traffic on the roadway; types of other vehicles on the roadway; weights of other vehicles on the roadway; weather conditions on the roadway; and
   defects in a surface of the roadway.

6. The computer-implemented method of claim 1, wherein the computer-implemented method further comprises:
   receiving, by an SDV on-board computer on the SDV, road condition reports about the roadway from multiple other SDVs on the roadway; and adjusting, by the SDV on-board computer on the SDV, which at least one tire path is chosen based on road condition reports about the roadway from multiple other SDVs on the roadway.

7. The computer-implemented method of claim 6, further comprising:
receiving, by the SDV on-board computer on the SDV, the road condition reports from a blockchain that is supported by the multiple other SDVs.

8. The computer-implemented method of claim 1, wherein the computer-implemented method is executed as a cloud-based service.

9. A computer program product comprising a non-transitory computer readable storage medium having program instructions embodied therewith, the program instructions readable and executable by a processor to cause the processor to:
determine a pattern of tire path usage by vehicles on a roadway;
direct an on-board computer of a vehicle to recommend at least one tire path for the vehicle to drive thereon based on the pattern of tire path usage by the vehicles on the roadway, wherein the vehicle is a self-driving vehicle (SDV);
determine that the SDV is riding on studded tires; and
adjust which at least one tire path is chosen based on the SDV riding on the studded tires.

10. The computer program product of claim 9, wherein the at least one tire path comprises multiple tire paths, and wherein the program instructions are further readable and executable by the processor to cause the processor to:
determine that the roadway is paved; and
direct an SDV on-board computer on the SDV to select a distribution of the multiple tire paths of a paved roadway for the SDV to drive thereon.

11. The computer program product of claim 9, wherein the program instructions are provided as a service in a cloud environment.

12. A system comprising:
one or more processors;
one or more computer readable memories operably coupled to the one or more processors; wherein the one or more computer readable memories have program instructions stored thereon for execution by at least one of the one or more processors, the program instructions comprising:
program instructions to determine a pattern of tire path usage by vehicles on a roadway;
program instructions to direct an on-board computer of a vehicle to recommend at least one tire path for the vehicle to drive thereon based on the pattern of tire path usage by the vehicles on the roadway, wherein the vehicle is a self-driving vehicle (SDV);
program instructions to determine that the SDV is riding on studded tires; and
program instructions to adjust which at least one tire path is chosen based on the SDV riding on the studded tires.

13. The system of claim 12, wherein the at least one tire path comprises multiple tire paths, and wherein the program instructions further comprise:
program instructions to determine that the roadway is paved; and
program instructions to direct an SDV on-board computer on the SDV to select a distribution of the multiple tire paths of a paved roadway for the SDV to drive thereon.

14. The system of claim 12, wherein the program instructions are provided as a service in a cloud environment.

* * * * *